March 10, 1936.  G. W. HALL ET AL  2,033,766

CONNECTING LINK

Filed Nov. 1, 1933

Inventors
GEORGE W. HALL.
CHAUNCEY C. BARTON.

By Louis V. Lucia
Attorney

Patented Mar. 10, 1936

2,033,766

UNITED STATES PATENT OFFICE 2,033,766

CONNECTING LINK

George W. Hall, Moodus, and Chauncey C. Barton, Wethersfield, Conn.

Application November 1, 1933, Serial No. 696,196

3 Claims. (Cl. 24—236)

Our invention relates to that class of connecting links which are used, on anti-skid chains for automobiles, for the purpose of connecting each of the cross chains to the circumferential chains commonly used in devices of this kind.

It is commonly known that, in anti-skid chains, the cross chains will wear out so that it becomes necessary to replace them at once in order to insure safety.

Connecting links of this type have been heretofore devised but in each case it requires the use of both hands and considerable force must be applied with the fingers in order to disengage the chains from the connecting links. It is very difficult to remove the cross chains and especially in extreme cold weather when the operator's hands are cold and the connecting links cannot be readily manipulated.

An object of our invention is to provide a connecting link by means of which a cross chain may be readily and quickly attached or detached from the circumferential chains in the manner to be hereafter described.

A further object of our invention is to provide a connecting link which can be economically constructed from sheet metal and which is durable as well as simple to manufacture.

Figure 1:
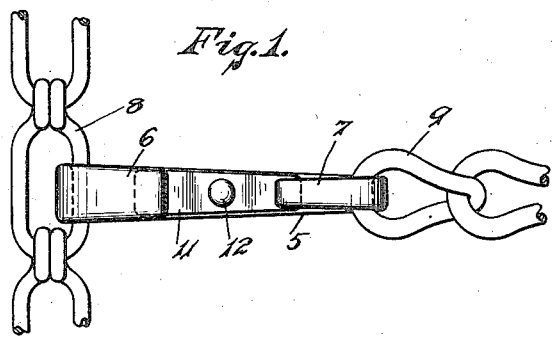
Figure 1 is a plan view of our improved connecting link showing the same as used between the cross chain and a circumferential chain.
Figure 2:
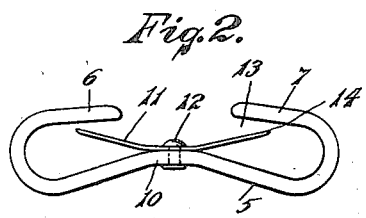
Figure 2 is a side view of the said link.

As illustrated in the drawing, in which like numerals denote like parts, our connecting link is constructed in the form of a double hook from a bar 5 which is blanked from a piece of sheet metal. The bar is bent over at each end to provide hooked portions 6 and 7. The hook 6 being of a width to conform substantially to the links 8 of a circumferential chain member, and the hook 7 being comparatively narrow to conform with the links 9 of the cross chain. The center of the bar 5 is formed upwardly as at 10 and a retaining spring member 11 is mounted to the center of said bar and attached thereto in a suitable manner such as by means of a rivet 12.

The said spring extends at each end thereof for a considerable distance within the hook portions 6 and 7 and is disposed at an angle with relation to the ends of the said hooked portions so that a space is provided, between the said spring member and the end of each of the hooks, which flares outwardly from the ends of said spring towards the ends of the hooks.

The ends of the spring do not come in contact with the hooks as commonly done in previous devices of this kind, but terminate at a distance from said hooks which is approximately one half the diameter of the links that are to be received in said hooks.

Figure 4:
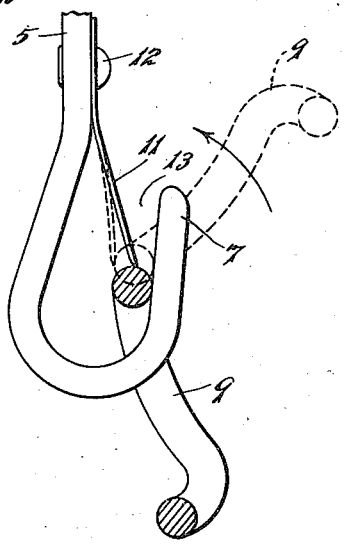
Figure 4 is a similar view illustrating the matter of detaching the chain therefrom.

The said spring is provided, at the end thereof, with a sharp edge 14 which is adapted to bite into the link 9 when it is moved in contact with the said end of the spring and thereby causes the spring to be easily flexed, to the position shown in dotted lines of Figure 4, by rotation of the link.

The spring is then bent into shape and, when it is attached to the bar 5, the said sharp edge is on the top of the spring and nearest to the inside of the hooks 6 and 7.

Figure 3:
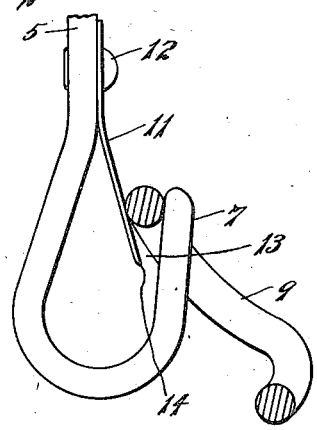
Figure 3 is an enlarged view illustrating the manner of attaching a chain to said link.

In the operation of our device the link 9 of the cross chain is inserted in the flared passage 13, as illustrated in Figure 3 of the drawing. The wide portion of this opening being larger than the diameter of the link so that the link may be readily received therein between the end of the hook and the spring. After the link has been placed in the position illustrated in Figure 3, the link is merely pulled downwardly, forcing the spring back and permitting the link to be received within the hook.

When it is desired to detach the link from the hook, the link is pushed upwardly against the end of the spring as illustrated in Figure 4. This permits the sharp edge of the spring to substantially bite into the surface of the link so that it will become positively engaged therewith, and by lifting the link upwardly in a rotating motion, as indicated by the arrow, to the position shown in dotted lines, the spring will be forced back, to the position also shown in dotted lines, thus permitting the link to be easily removed from the hook.

It can be readily understood that by means of the particular form of the hook and spring, which provides the flared opening between the same, the link can be readily attached to the hook with one mere pull and detached from the said hook by a simple upward motion, both of which operations can be quickly performed with one hand. This provides an ease in the operation of attaching or detaching the cross chains which is not possible with devices heretofore invented.

After the links have been engaged in the hooks, they cannot become disengaged of their own accord as they cannot pass by the ends of the spring member without the rotary motion illustrated in Figure 4. Thus a sufficient margin of safety is provided against the accidental disengagement of the cross chains.

If desired, our improved connecting links may be made single and permanently attached to the circumferential chain links 8. The same may also be made from a forging or casting if preferred, or in any other manner which will provide the opening and the flared passage between the retaining spring and the hook portions by which the above objects are attained.

While we have illustrated and described our invention in the above form it is to be understood, however, that the same may be changed to a greater or lesser extent without departing from the scope of our invention.

We claim:

1. A connecting link of the character described comprising a shank having its end formed to provide a hook adapted to receive a removable member, a retaining spring member secured to said shank and having its free end extending within said hook, the said free end having a sharp edge spaced from and extending towards the end of said hook and adapted to substantially bite into said removable member when engaged thereby to cause positive movement of said spring by movement of said member.

2. A connecting link of the character described comprising a shank portion having its end formed into a hook adapted to receive a member removably attachable thereto, a retaining spring secured to said shank portion and having its free end extending within said hook, the said free end presenting a sharp edge on that portion thereof which is nearest to said hook, said edge being spaced from said hook and adapted to bite substantially into said member upon engagement therewith.

3. A connecting link of the character described comprising a shank having its end formed into a hook formed to receive a member removably attachable thereto, a retaining spring secured to said shank having its free end extending within said hook, the said free end being spaced from the end of said hook and adapted to engage and to substantially bite into the said member to cause movement of said spring by the operation of disengaging said member from said hook.

GEORGE W. HALL.
CHAUNCEY C. BARTON.